(12) United States Patent
Hu

(10) Patent No.: US 7,059,734 B1
(45) Date of Patent: Jun. 13, 2006

(54) AUXILIARY REARVIEW MIRROR MOUNTING STRUCTURE

(76) Inventor: Tsai-Fu Hu, 200,Fu Chiang Road, Sec. 2, Yung Kang, Tainan (TW)

( * ) Notice: Subject to any disclaimer, the term of this patent is extended or adjusted under 35 U.S.C. 154(b) by 0 days.

(21) Appl. No.: 11/234,661

(22) Filed: Sep. 23, 2005

(51) Int. Cl.
*G02B 7/182* (2006.01)

(52) U.S. Cl. ........................... 359/872; 359/865
(58) Field of Classification Search ............ 359/871, 359/872, 865, 875
See application file for complete search history.

(56) References Cited

U.S. PATENT DOCUMENTS

| | | | | |
|---|---|---|---|---|
| 4,892,400 A | * | 1/1990 | Brookes et al. | 359/865 |
| 5,165,081 A | * | 11/1992 | Drumheller | 359/854 |
| 5,221,068 A | * | 6/1993 | Varner et al. | 248/231.41 |
| D350,521 S | * | 9/1994 | Hu | D12/187 |

* cited by examiner

*Primary Examiner*—Drew A. Dunn
*Assistant Examiner*—Scott H. Stephens
(74) *Attorney, Agent, or Firm*—Pro-Techtor Int'l Services (57) ABSTRACT

An auxiliary rearview mirror mounting structure for fastening an auxiliary rearview mirror to a main rearview mirror is disclosed to include two support arms, which are pivotally connected to the auxiliary rearview mirror and each have a two hooks for hooking on the rim of the auxiliary rearview mirror and two flexible connecting members inserted through a respective horizontal front insertion hole and a respective vertical rear insertion hole and adjustably coupled to a respective vertical sliding track at the respective support arm, and two length-adjustable binding devices connected between the flexible connecting members at the support arms for securing the support arms to the main rearview mirror.

8 Claims, 8 Drawing Sheets

AUXILIARY REARVIEW MIRROR MOUNTING STRUCTURE

BACKGROUND OF THE INVENTION

1. Field of the Invention

The present invention relates to vehicle rearview mirror and more particularly, to an auxiliary rearview mirror mounting structure.

2. Description of the Related Art

Figure 1:
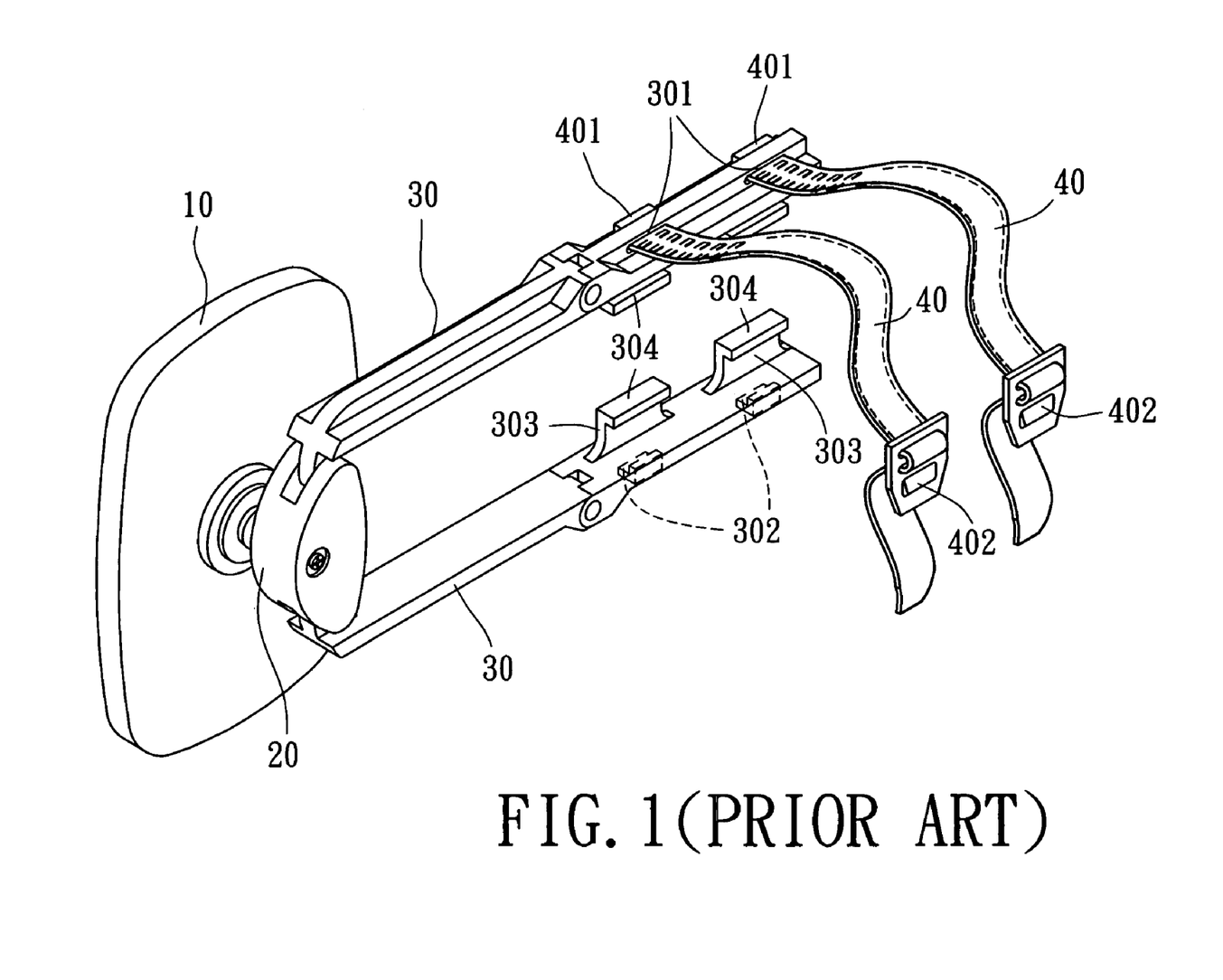
FIG. 1 is an elevational view of an auxiliary rearview mirror mounting structure according to the prior art.
Figure 2:
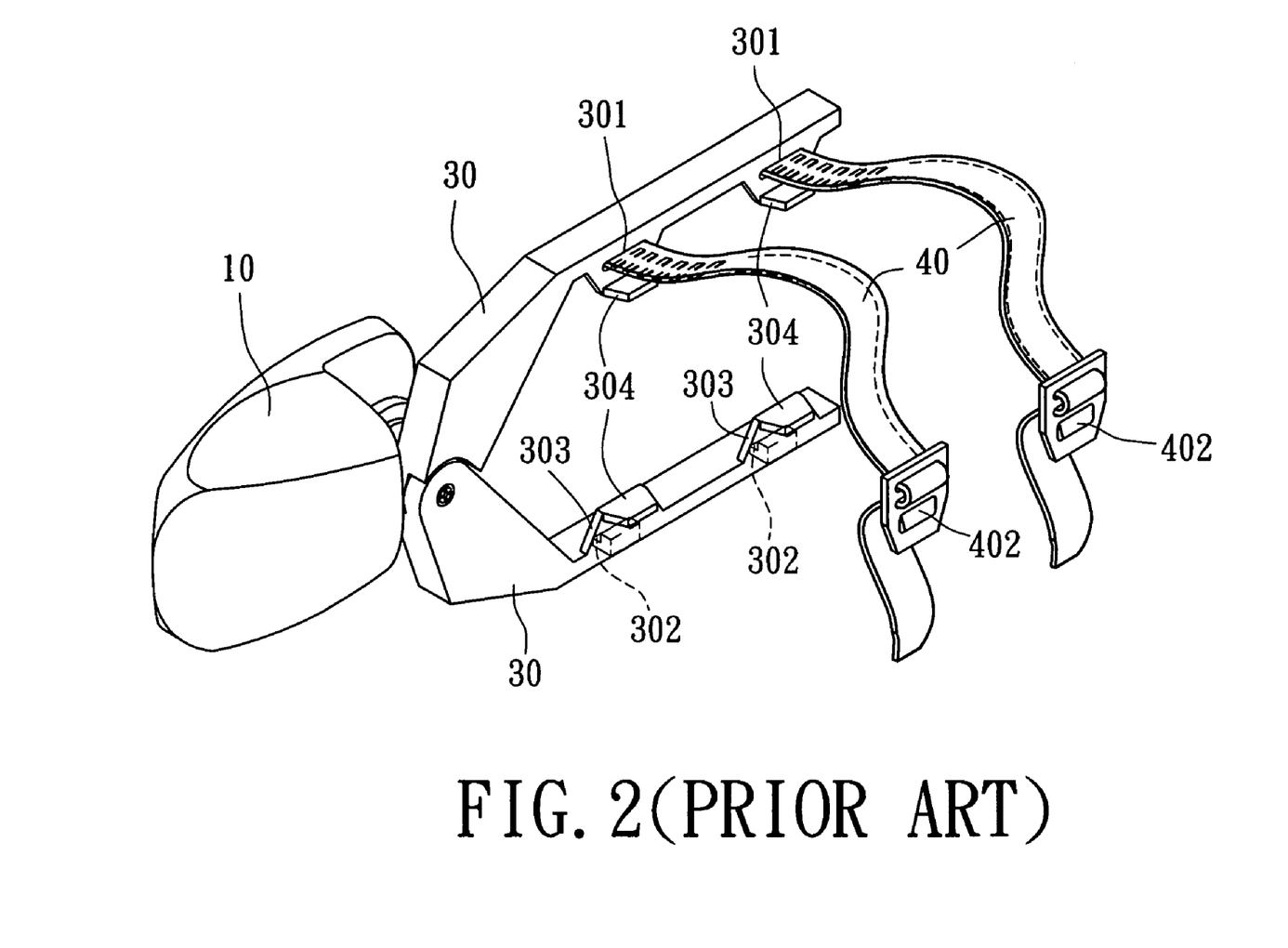
FIG. 2 is an elevational view of another design of auxiliary rearview mirror mounting structure according to the prior art.
Figure 3:
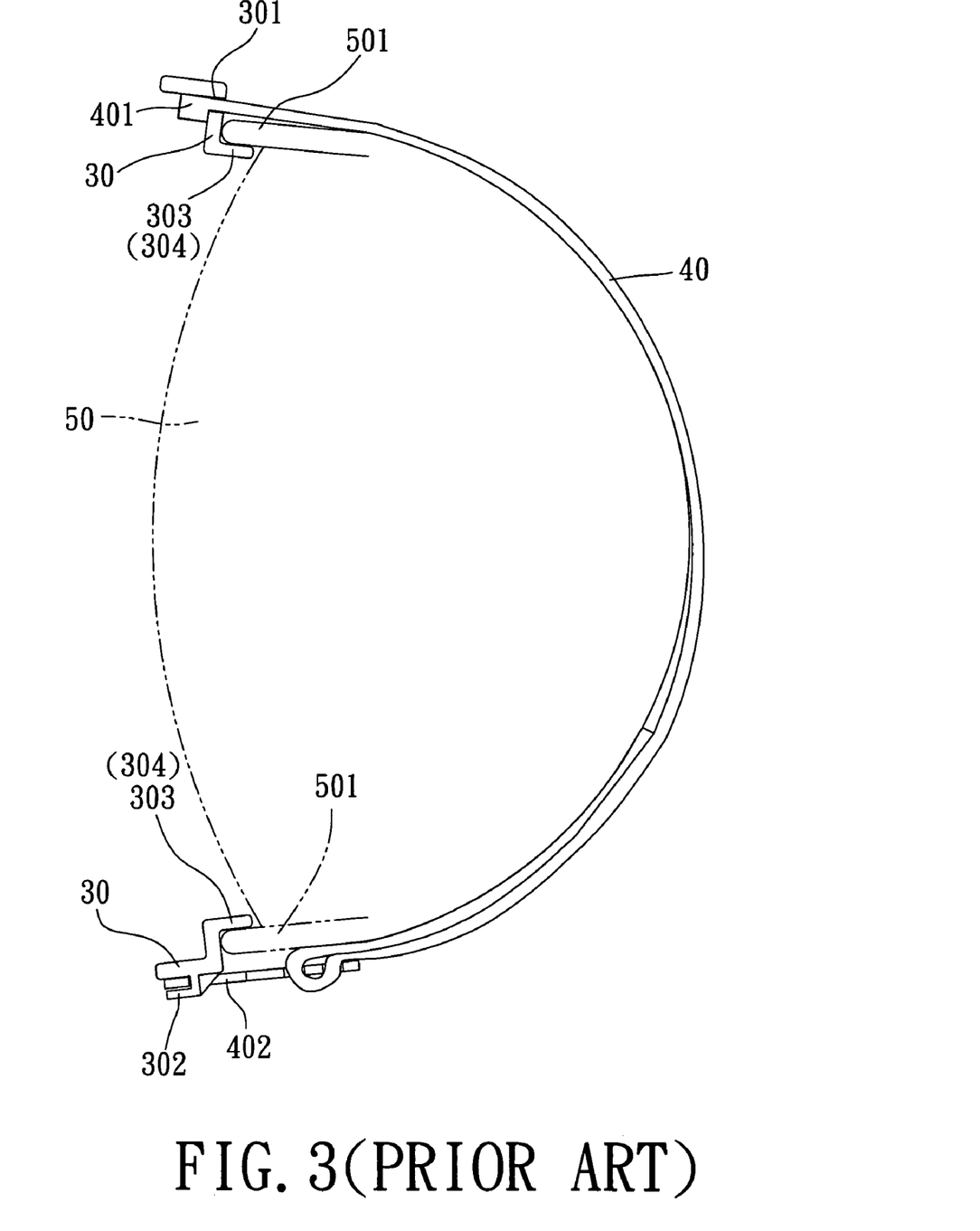
FIG. 3 is a schematic drawing showing the prior art auxiliary rearview mirror mounting structure installed in a vehicle main rearview mirror.

FIG. 1 shows the mounting structure of an auxiliary rearview mirror according to the prior art. According to this design, the auxiliary rearview mirror 10 has a connector 20 provided at the back side, two support arms 30 respectively pivoted to the connector 20, and two fastening straps 40 that secure the support arms 30 to the main rearview mirror 50 (see FIG. 3). Alternatively, the aforesaid connector 20 can be eliminated, and the support arms 30 can be directly pivoted to the auxiliary rearview mirror 10 (see FIG. 2). The fastening straps 40 each have a retaining portion 401 disposed at one end and fastened to a respective mounting hole 301 at one support arm 30, and a strap fitting 402 adjustably provided at the other end and fastened to a respective hook 302 at the other support arm 30. Further, each support arm 30 is provided with substantially L-shaped retaining frames 303 that have each a hooked portion 304 for hooking on the rim 501 of the main rearview mirror 50. According to this design, the L-shaped retaining frames 303 have a fixed height, i.e., the distance between the hooked portion 304 and the respective support arm 30 is constant and fits only one particular model of main rearview mirror that has a predetermined thickness of rim. If the thickness of the rim 501 of the main rearview mirror 50 does not fit the distance between the hooked portion 304 and the respective support arm 30 perfectly, the auxiliary rearview mirror 10 may vibrate relative to or fall from the main rearview mirror 50 during running of the motor vehicle.

SUMMARY OF THE INVENTION

The present invention has been accomplished under the circumstances in view. It is therefore the main object of the present invention to provide an auxiliary rearview mirror mounting structure, which secures firmly the auxiliary rearview mirror to the main rearview mirror against vibration. It is another object of the present invention to provide an auxiliary rearview mirror mounting structure, which fits any of a variety of vehicle main rearview mirrors. To achieve these and other objects of the present invention, the auxiliary rearview mirror mounting structure comprises an auxiliary rearview mirror; two support arms respectively connected to the auxiliary rearview mirror; and two binding devices connected between the support arms for securing the support arms to a main rearview mirror; wherein the support arms each have a mounting structure for fastening to a main rearview mirror by the binding devices, the mounting structure comprising two horizontal front insertion holes, two vertical rear insertion holes corresponding to the horizontal front insertion holes, two vertical sliding tracks disposed adjacent to the vertical rear insertion holes, and two flexible connecting members adapted to secure the binding devices to the support arms, the flexible connecting members each having a first end respectively slidably coupled to the vertical sliding tracks of the support arms and provided with a hook for hooking on a rim of the main rearview mirror to which the binding devices are fastened and a second end respectively inserted through the vertical rear insertion holes and then the horizontal front insertion holes for the connection of the binding devices.

DETAILED DESCRIPTION OF THE PREFERRED EMBODIMENT

Figure 4:
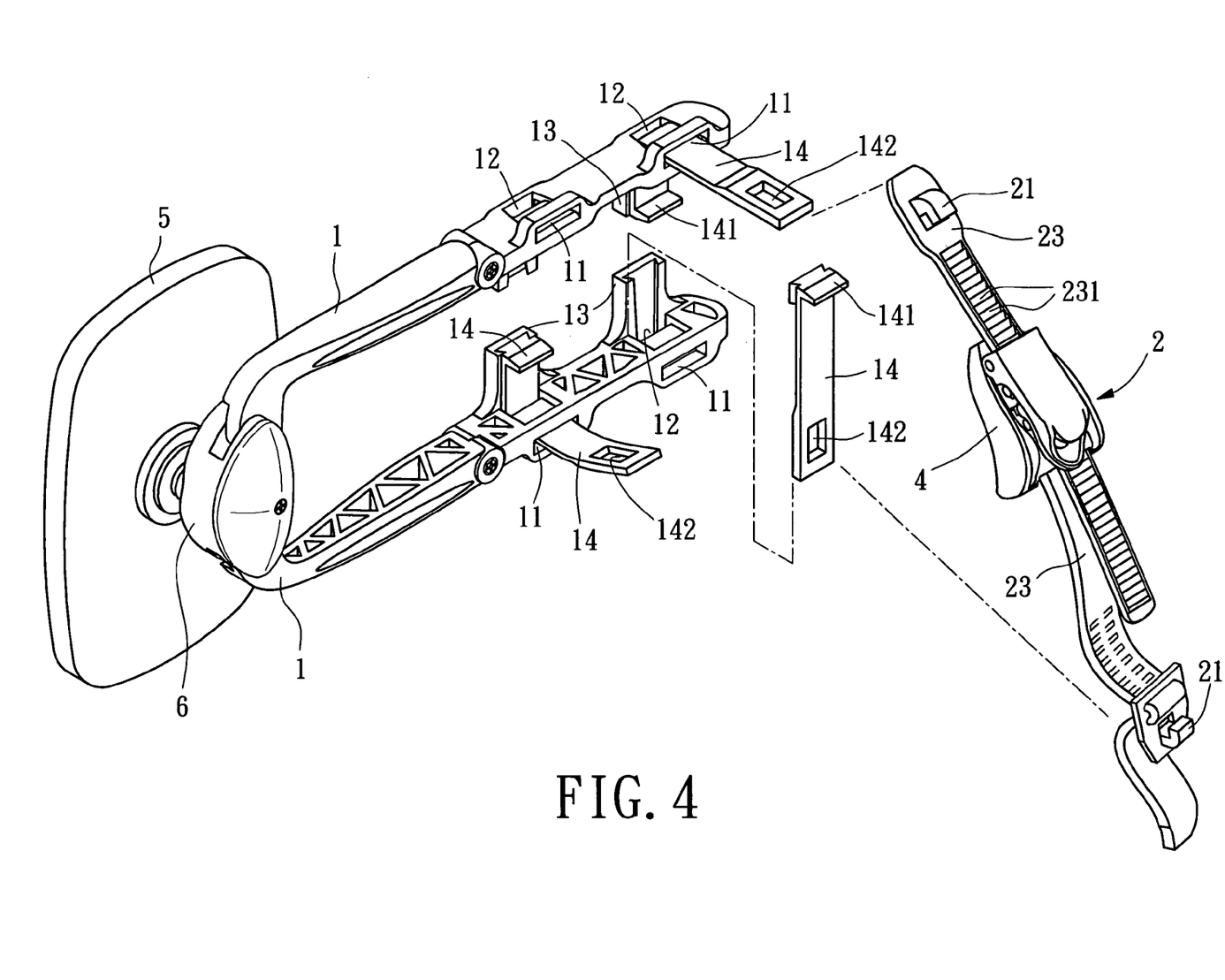
FIG. 4 is an exploded view of an auxiliary rearview mirror mounting structure according to the present invention.
Figures 5, 5A:
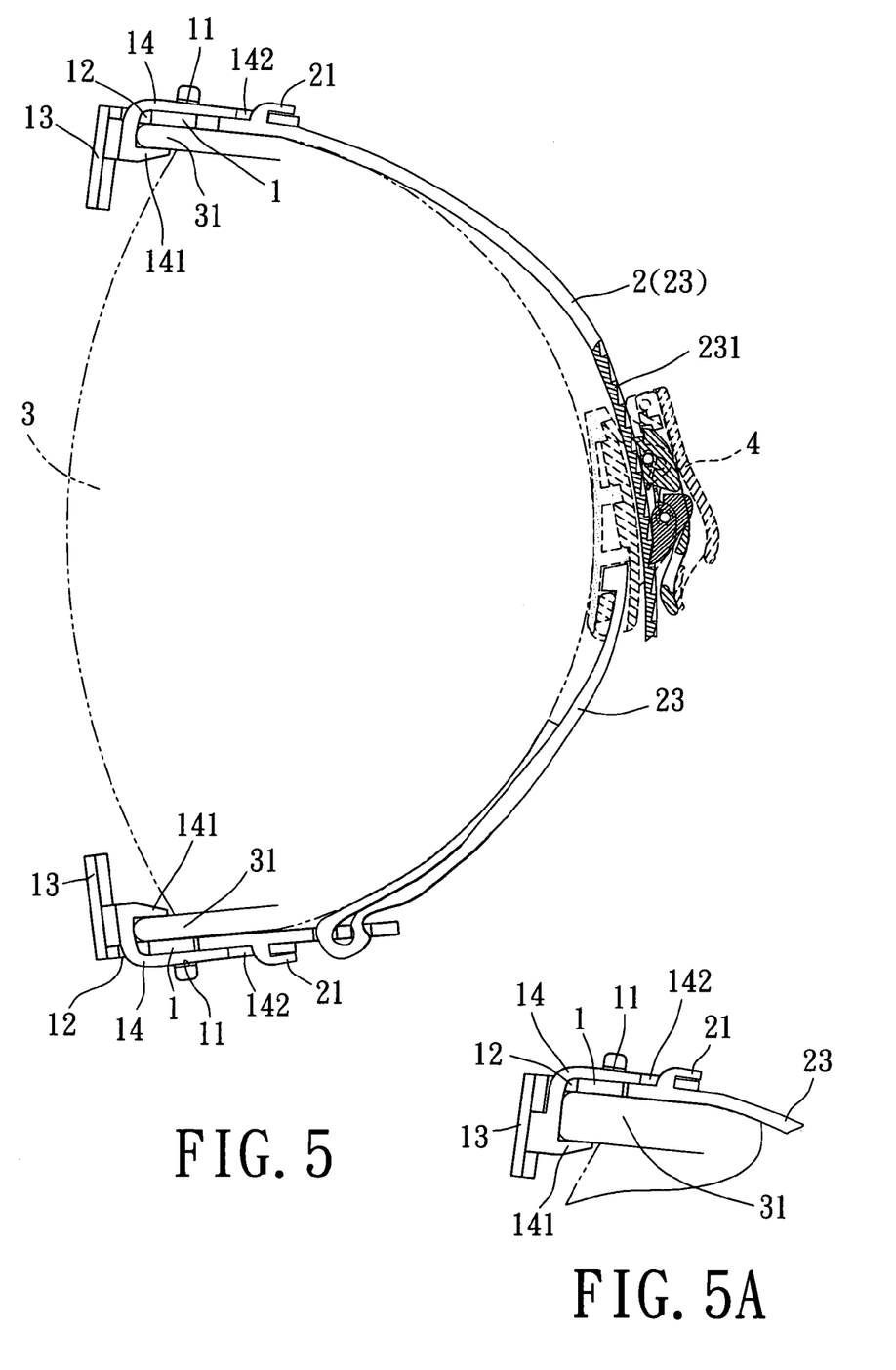
FIG. 5 is a schematic drawing showing the auxiliary rearview mirror mounting structure fastened to a main rearview mirror according to the present invention.
FIG. 5A is an enlarged view of a part of FIG. 5.

Referring to FIGS. 4, 5 and 5A, an auxiliary rearview mirror mounting structure in accordance with the present invention is shown comprising a connector 6 provided at the back side of an auxiliary rearview mirror 5, two support arms 1 respectively pivoted to the connector 6, and two binding devices 2 for securing the support arms 1 to a main rearview mirror 3.

The support arms 1 each have two horizontal front insertion holes 11, two vertical rear insertion holes 12 corresponding to the horizontal front insertion holes 11, two vertical sliding tracks 13 respectively upwardly disposed adjacent to the vertical rear insertion holes 12. Further, two flexible connecting members 14 are provided for securing the binding devices 2 to the support arms 1. The vertical sliding tracks 13 can be a dovetail track or the like. The flexible connecting members 14 each have one end, namely, the rear end respectively slidably coupled to the vertical sliding tracks 13 and the other end, namely, the front end respectively inserted through the vertical rear insertion holes 12 and then the horizontal front insertion holes 11 of the respective support arms 1. Further, each flexible connecting member 14 has a hook 141 at the rear end for hooking on the rim 31 of the main rearview mirror 3, and a hook hole 142 at the front end for receiving the binding devices 2. The binding devices 2 each have two hooks 21 at the two distal ends for fastening to the hook holes 142 of the flexible connecting members 14. Further, each binding device 2 is comprised of two straps 23. One strap 23 has a longitudinal series of sloping teeth 231. The other strap 23 has a clip 4 provided at one end for selectively fastening to the longitudinal series of sloping teeth 231 at the desired location to adjust the length of the respective binding device 2 subject to the size of the main rearview mirror 3.

FIGS. 5 and 5A show the auxiliary rearview mirror mounting structure installed in the main rearview mirror 3. During installation, the user can adjust the length of the binding devices 2 to fit the size of the main rearview mirror 3 so that the auxiliary rearview mirror 5 is positively secured to the main rearview mirror 3 and will not vibrate during movement of the motor vehicle. When fastening up the binding devices 2, the binding devices 2 impart a pull force to the flexible connecting members 4, thereby enhancing the engagement between the hooks 141 and the rim 31 of the main rearview mirror 3.

Figure 6:
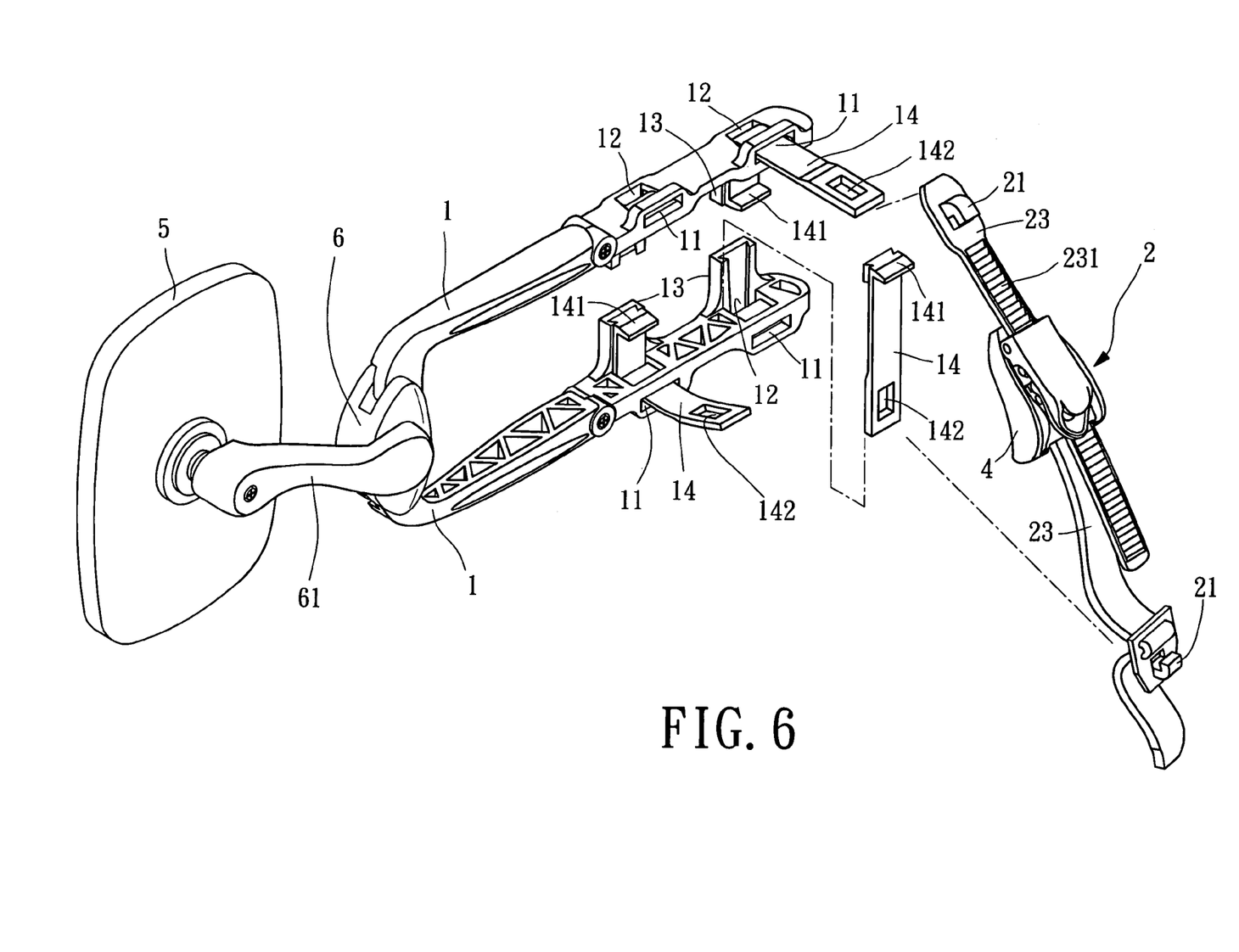
FIG. 6 is an exploded view of an alternate form of the auxiliary rearview mirror mounting structure according to the present invention.

FIG. 6 shows an alternate form of the auxiliary rearview mirror mounting structure according to the present invention. This embodiment is substantially similar to the embodiment shown in FIG. 4 with the exception that a connecting bar 61 is pivotally connected between the auxiliary rearview mirror 5 and the connector 6 to extend the length of the whole assembly of the auxiliary rearview mirror.

Figure 7:
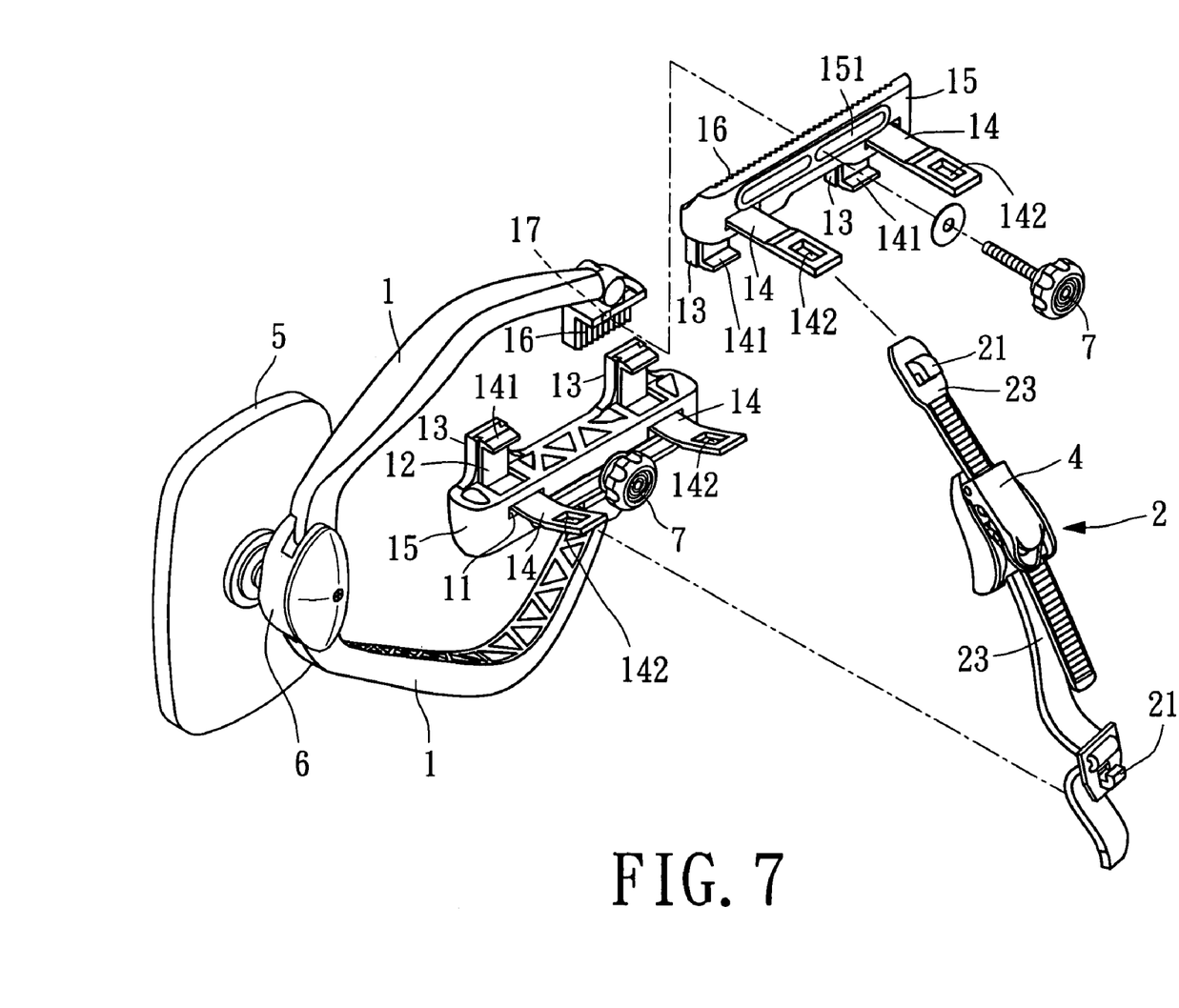
FIG. 7 is an exploded view of another alternate form of the auxiliary rearview mirror mounting structure according the present invention.

FIG. 7 shows another alternate form of the auxiliary rearview mirror mounting structure according to the present invention. According to this embodiment, two narrow elongated adjustable holder blocks 15 are respectively adjustably fastened to the support arms 1 and locked thereto by a respective lock screw 7. The lock screw 7 is inserted through an elongated sliding slot 151 at one holder block 15 and threaded into a screw hole 17 at one support arm 1 to affix the respective holder block 15 to the respective support arm 1. Further, toothed portions 16 are respectively provided at the free end of each support arm 1 and the back side of each holder block 15 for engagement. By means of adjusting the position of the holder blocks 15 relative to the support arms 1, the total length of the auxiliary rearview mirror mounting structure is relatively adjusted to fit the size of the main rearview mirror 3. Further, the aforesaid horizontal front insertion holes 11, vertical rear insertion holes 12, vertical sliding tracks 13 and connecting members 14 are respectively provided at the holder blocks 15, and the binding devices 2 are respectively fastened to the holder blocks 15 for securing the holder blocks 15 to the main rearview mirror 3.

Figure 7A:
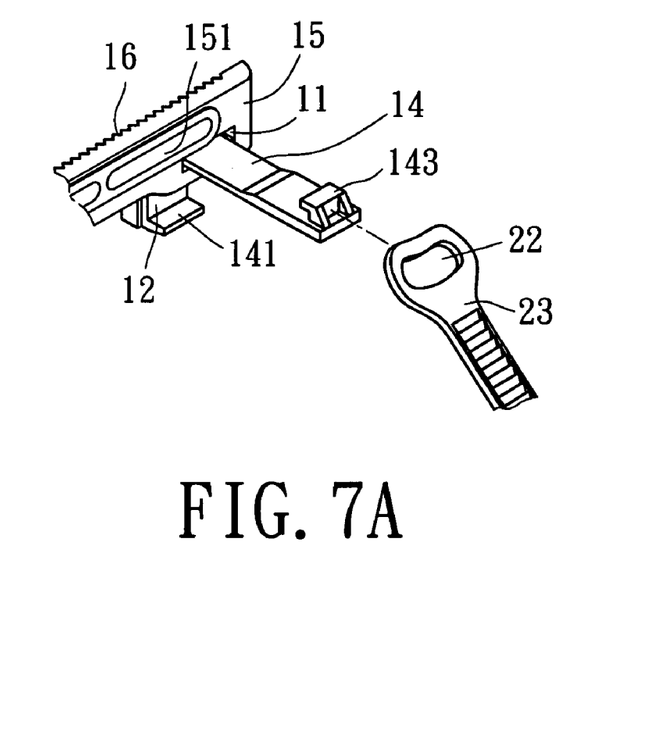
FIG. 7A is an exploded view of a part of still another alternate form of the auxiliary rearview mirror mounting structure according to the present invention.

FIG. 7A is an exploded view of a part of still another alternate form of the auxiliary rearview mirror mounting structure according to the present invention. According to this embodiment, each flexible connecting member 14 has a hook 143 at the front end for receiving one strap 23 of the respective binding device, and each strap 23 of each binding device 2 has a hook hole 22 for fastening to the hook 143 at the front end of the respective flexible connecting member 14.

Figure 7B:
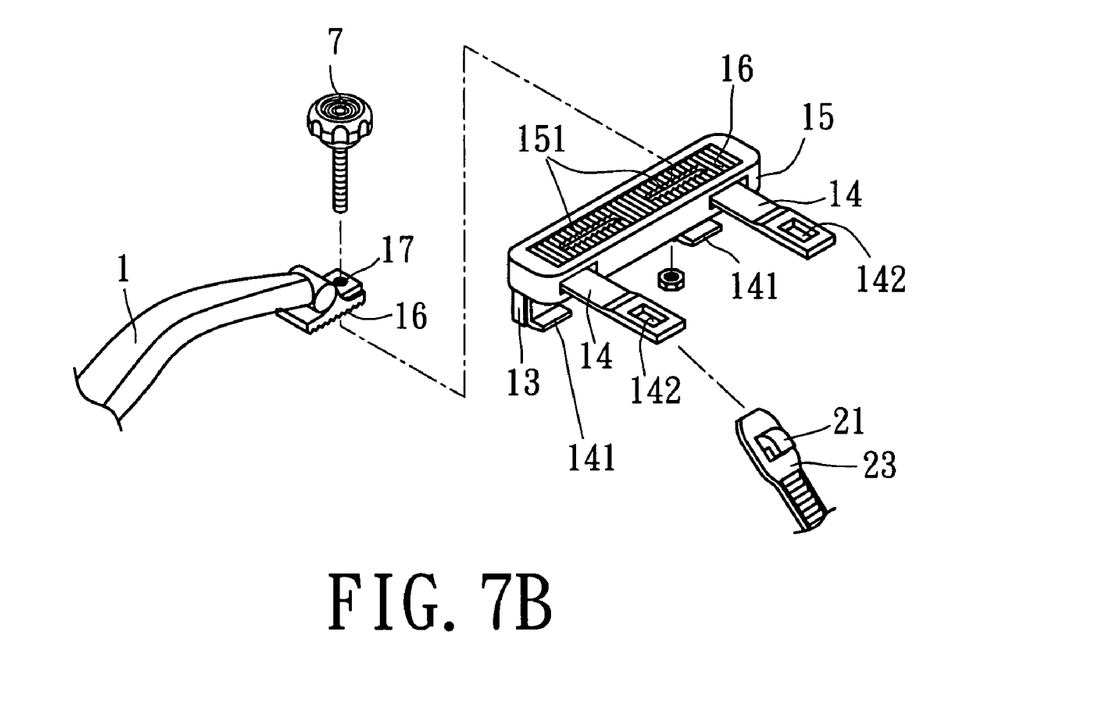
FIG. 7B is an exploded view of a part of still another alternate form of the auxiliary rearview mirror mounting structure according to the present invention.

FIG. 7B is an exploded view of a part of still another alternate form of the auxiliary rearview mirror mounting structure according to the present invention. This embodiment is substantially similar to the embodiment shown in FIG. 7 with the exception of the location of the screw hole 17 at each support arm 1.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An auxiliary rearview mirror mounting structure comprising:
    an auxiliary rearview mirror;
    two support arms respectively connected to said auxiliary rearview mirror; and
    two binding devices connected between said support arms for securing said support arms to a main rearview mirror;
    wherein said support arms each have a mounting structure for fastening to a main rearview mirror by said binding devices, said mounting structure comprising two horizontal front insertion holes, two vertical rear insertion holes corresponding to said horizontal front insertion holes, two vertical sliding tracks disposed adjacent to said vertical rear insertion holes, and two flexible connecting members adapted to secure said binding devices to said support arms, said flexible connecting members each having a first end respectively slidably coupled to the vertical sliding tracks of said support arms and provided with a hook for hooking on a rim of the main rearview mirror to which said binding devices are fastened and a second end respectively inserted through said vertical rear insertion holes and then said horizontal front insertion holes for the connection of said binding devices.

2. The auxiliary rearview mirror mounting structure as claimed in claim 1, wherein the second end of each of said flexible connecting members has a hook hole; said binding devices each have a hook disposed at each of two distal ends thereof for hooking on the hook hole at the second end of each of said flexible connecting members.

3. The auxiliary rearview mirror mounting structure as claimed in claim 1, wherein the second end of each of said flexible connecting members has a hook; said binding devices each have a hook hole disposed at each of two distal ends thereof for fastening to the hook at the second end of each of said flexible connecting members.

4. The auxiliary rearview mirror mounting structure as claimed in claim 1, further comprising a connecting bar, said connecting bar having a first end pivotally connected to said auxiliary rearview mirror and a second end, and a connector pivotally connecting said support arms to the second end of said connecting bar.

5. The auxiliary rearview mirror mounting structure as claimed in claim 1, wherein said mounting structure further comprises a holder block, said holder block having the horizontal front insertion holes, vertical rear insertion holes and vertical sliding tracks of the respective support arm formed thereon, and lock means to lock said holder block to the respective support arm.

6. The auxiliary rearview mirror mounting structure as claimed in claim 5, wherein said lock means is a lock screw.

7. The auxiliary rearview mirror mounting structure as claimed in claim 6, wherein the holder block of each of said support arms has an elongated sliding slot for the mounting of said lock screw; said support arms each have a screw hole for receiving the respective lock screw.

8. The auxiliary rearview mirror mounting structure as claimed in claim 6, wherein the holder block of each of said support arms has a toothed portions disposed at a back side thereof engageable to a respective toothed portion at the respective support arm.

\* \* \* \* \*